United States Patent
Ooki et al.

(10) Patent No.: US 12,085,756 B2
(45) Date of Patent: Sep. 10, 2024

(54) FUSION SPLICING DEVICE MANAGEMENT SYSTEM AND FUSION SPLICING DEVICE MANAGEMENT METHOD

(71) Applicant: SUMITOMO ELECTRIC OPTIFRONTIER CO., LTD., Yokohama (JP)

(72) Inventors: Kazuyoshi Ooki, Yokohama (JP); Hideaki Yusa, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 1009 days.

(21) Appl. No.: 16/961,520

(22) PCT Filed: Dec. 28, 2018

(86) PCT No.: PCT/JP2018/048566
§ 371 (c)(1),
(2) Date: Jul. 10, 2020

(87) PCT Pub. No.: WO2019/142652
PCT Pub. Date: Jul. 25, 2019

(65) Prior Publication Data
US 2020/0341196 A1  Oct. 29, 2020

(30) Foreign Application Priority Data
Jan. 17, 2018  (JP) .................. 2018-005734

(51) Int. Cl.
*G02B 6/255* (2006.01)
*G06Q 10/0631* (2023.01)
(Continued)

(52) U.S. Cl.
CPC .......... *G02B 6/2553* (2013.01); *G02B 6/255* (2013.01); *G06Q 10/063112* (2013.01);
(Continued)

(58) Field of Classification Search
CPC .. G02B 6/255; G02B 6/2553; G06Q 10/0633; G06Q 10/06314; G06Q 10/063112;
(Continued)

(56) References Cited

U.S. PATENT DOCUMENTS

| | | | |
|---|---|---|---|
| 6,742,705 | B1 | 6/2004 | Clark |
| 2010/0312604 | A1 | 12/2010 | Mitchell et al. |
| 2013/0284377 | A1 | 10/2013 | Takayanagi et al. |

FOREIGN PATENT DOCUMENTS

| | | |
|---|---|---|
| CN | 103926652 A | 7/2014 |
| JP | 2004-112853 A | 4/2004 |

(Continued)

OTHER PUBLICATIONS

Guido et al., "Workforce management (WFM) issues," Network Operations and Management Symposium, IEEE, 1998, Feb. 15-20, 1998, vol. 2, pp. 473-482.

(Continued)

*Primary Examiner* — Michael P Mooney
(74) *Attorney, Agent, or Firm* — Oliff PLC

(57) ABSTRACT

A fusion splicer management system for managing progress of a fusion splicing work performed by each splicing technician by using a fusion splicer. This management system includes an acquisition unit, a determination unit, and a notification unit. The acquisition unit acquires fusion splicing data regarding the fusion splicing work performed by each splicing technician who uses each fusion splicer whenever each fusion splicing work is performed. The determination unit determines a progress status of each fusion splicing work by comparing the fusion splicing data with work plan data indicating a work plan. The notification unit notifies of the progress status of each fusion splicing work determined by the determination unit.

9 Claims, 13 Drawing Sheets

(51) Int. Cl.
*G06Q 10/0633* (2023.01)
*G06Q 10/10* (2023.01)

(52) U.S. Cl.
CPC . *G06Q 10/063114* (2013.01); *G06Q 10/0633* (2013.01); *G06Q 10/103* (2013.01)

(58) Field of Classification Search
CPC ......... G06Q 10/103; G06Q 10/063114; G06Q 10/06395; G05B 19/0426
See application file for complete search history.

(56) References Cited

FOREIGN PATENT DOCUMENTS

| | | | |
|---|---|---|---|
| JP | 2006-58474 A | * | 3/2006 |
| JP | 2006-058474 A | | 3/2006 |
| JP | 2008-158648 A | * | 12/2006 |
| JP | 2012-141357 A | | 7/2012 |
| JP | 2017-224076 A | | 12/2017 |

OTHER PUBLICATIONS

Mar. 26, 2019 International Search Report issued in International Patent Application No. PCT/JP2018/048566.

* cited by examiner

Fig. 8

PROJECT STATUS LIST SCREEN

PROJECT: AA PROJECT
TEAM: A TEAM
SCHEDULED NUMBER OF TIMES OF SPLICING: 200
ESTIMATED LOSS ALLOWABLE RANGE: ≤ 0.03dB
END SURFACE ANGLE ALLOWABLE RANGE: ≤ 3.5°
PERSON IN CHARGE: PERSON A

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #1 | 11:20:10 | LOCATION A | 0.01dB | 0.1° | 0.1° |
| #1 | 11:21:00 | LOCATION A | 0.01dB | 0.1° | 0.1° |
| #1 | 11:25:51 | LOCATION A | 0.01dB | 0.1° | 0.1° |
| #1 | 11:30:32 | LOCATION A | 0.01dB | 0.1° | 0.1° |
| #1 | 11:40:45 | LOCATION A | 0.01dB | 0.1° | 0.1° |
| #1 | 13:02:17 | LOCATION A | 0.01dB | 0.1° | 0.1° |

PERSON IN CHARGE: PERSON B

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #2 | 11:21:38 | LOCATION A | 0.01dB | 0.1° | 0.1° |
| #2 | 11:28:09 | LOCATION A | 0.01dB | 0.2° | 0.1° |
| #2 | 11:40:03 | LOCATION A | 0.03dB | 0.3° | 0.1° |
| #2 | 13:01:09 | LOCATION A | 0.01dB | 0.1° | 0.1° |
| #2 | 13:20:21 | LOCATION A | 0.01dB | 0.4° | 0.1° |
| #2 | 13:25:33 | LOCATION A | 0.01dB | 0.1° | 0.1° |

PERSON IN CHARGE: PERSON C

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #3 | 11:20:45 | LOCATION A | 0.01dB | 0.1° | 0.1° |
| #3 | 11:26:10 | LOCATION A | 0.02dB | 0.2° | 0.2° |
| #3 | 11:28:15 | LOCATION A | 0.03dB | 0.1° | 0.7° |
| #3 | 11:29:55 | LOCATION A | 0.03dB | 0.4° | 0.8° |
| #3 | 11:35:00 | LOCATION A | 0.04dB | 0.4° | 0.1° |
| #3 | 13:45:53 | LOCATION A | 0.01dB | 0.1° | 0.1° |

PROJECT: BB PROJECT
TEAM: B TEAM
SCHEDULED NUMBER OF TIMES OF SPLICING: 500
ESTIMATED LOSS ALLOWABLE RANGE: ≤ 0.05dB
END SURFACE ANGLE ALLOWABLE RANGE: ≤ 3.5°
PERSON IN CHARGE: PERSON D

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #4 | 10:20:10 | LOCATION B | 0.01dB | 0.1° | 0.1° |
| #4 | 10:21:21 | LOCATION B | 0.01dB | 0.1° | 0.1° |
| #4 | 10:30:50 | LOCATION B | 0.01dB | 0.1° | 0.1° |
| #4 | 10:43:21 | LOCATION B | 0.01dB | 0.1° | 0.1° |
| #4 | 11:20:11 | LOCATION B | 0.01dB | 0.1° | 0.1° |
| #4 | 11:21:14 | LOCATION B | 0.01dB | 0.1° | 0.1° |

PERSON IN CHARGE: PERSON E

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #5 | 10:20:11 | LOCATION B | 0.03dB | 0.2° | 0.2° |
| #5 | 10:21:32 | LOCATION B | 0.03dB | 0.1° | 0.2° |
| #5 | 10:30:44 | LOCATION B | 0.03dB | 0.1° | 0.2° |
| #5 | 10:43:16 | LOCATION B | 0.04dB | 0.1° | 0.3° |
| #5 | 11:20:21 | LOCATION B | 0.04dB | 0.2° | 0.2° |
| #5 | 11:21:09 | LOCATION B | 0.03dB | 0.2° | 0.2° |

PERSON IN CHARGE: PERSON F

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #6 | 10:22:11 | LOCATION B | 0.01dB | 0.1° | 0.1° |
| #6 | 10:22:35 | LOCATION B | 0.05dB | 0.2° | 0.2° |
| #6 | 10:34:44 | LOCATION B | 0.05dB | 0.3° | 0.3° |
| #6 | 10:55:21 | LOCATION B | 0.06dB | 0.3° | 0.5° |
| #6 | 11:20:30 | LOCATION B | 0.06dB | 0.4° | 0.4° |
| #6 | 11:21:50 | LOCATION B | 0.01dB | 0.1° | 0.1° |

PROJECT: CC PROJECT
TEAM: C TEAM
SCHEDULED NUMBER OF TIMES OF SPLICING: 100
ESTIMATED LOSS ALLOWABLE RANGE: ≤ 0.02dB
END SURFACE ANGLE ALLOWABLE RANGE: ≤ 0.5°
PERSON IN CHARGE: PERSON G

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #7 | 11:20:10 | LOCATION C | 0.00dB | 0.1° | 0.1° |
| #7 | 11:22:22 | LOCATION C | 0.00dB | 0.1° | 0.1° |
| #7 | 11:32:10 | LOCATION C | 0.00dB | 0.1° | 0.1° |
| #7 | 11:55:11 | LOCATION C | 0.00dB | 0.1° | 0.1° |
| #7 | 12:00:00 | LOCATION C | 0.00dB | 0.1° | 0.1° |
| #7 | 13:10:45 | LOCATION C | 0.00dB | 0.1° | 0.1° |

PERSON IN CHARGE: PERSON H

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #8 | 11:19:20 | LOCATION C | 0.01dB | 0.3° | 0.6° |
| #8 | 11:24:11 | LOCATION C | 0.01dB | 0.4° | 0.4° |
| #8 | 11:45:12 | LOCATION C | 0.01dB | 0.5° | 0.3° |
| #8 | 11:56:05 | LOCATION C | 0.00dB | 0.1° | 0.1° |
| #8 | 12:11:43 | LOCATION C | 0.00dB | 0.1° | 0.1° |
| #8 | 13:11:11 | LOCATION C | 0.00dB | 0.1° | 0.1° |

PERSON IN CHARGE: PERSON I

| FUSING SPLICER | SPLICING TIME | SPLICING LOCATION | ESTIMATED LOSS | END SURFACE ANGLE (LEFT) | END SURFACE ANGLE (RIGHT) |
|---|---|---|---|---|---|
| #9 | 11:20:20 | LOCATION C | 0.00dB | 0.1° | 0.1° |
| #9 | 11:20:50 | LOCATION C | 0.01dB | 0.1° | 0.1° |
| #9 | 11:33:21 | LOCATION C | 0.01dB | 0.1° | 0.1° |
| #9 | 11:45:11 | LOCATION C | 0.01dB | 0.1° | 0.1° |
| #9 | 12:45:11 | LOCATION C | 0.01dB | 0.1° | 0.1° |
| #9 | 12:53:02 | LOCATION C | 0.01dB | 0.1° | 0.1° |
| #9 | 13:20:11 | LOCATION C | 0.01dB | 0.1° | 0.1° |

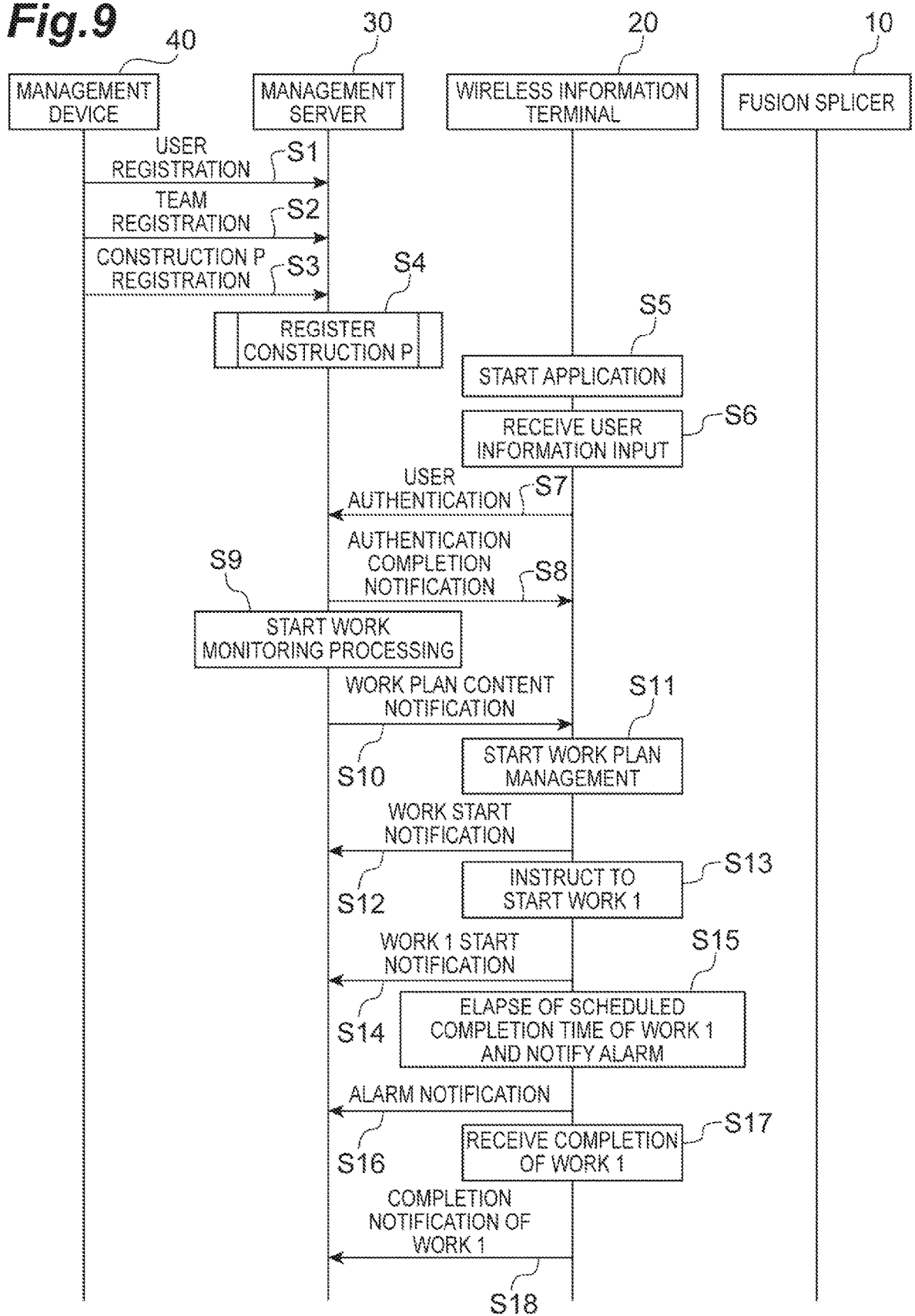

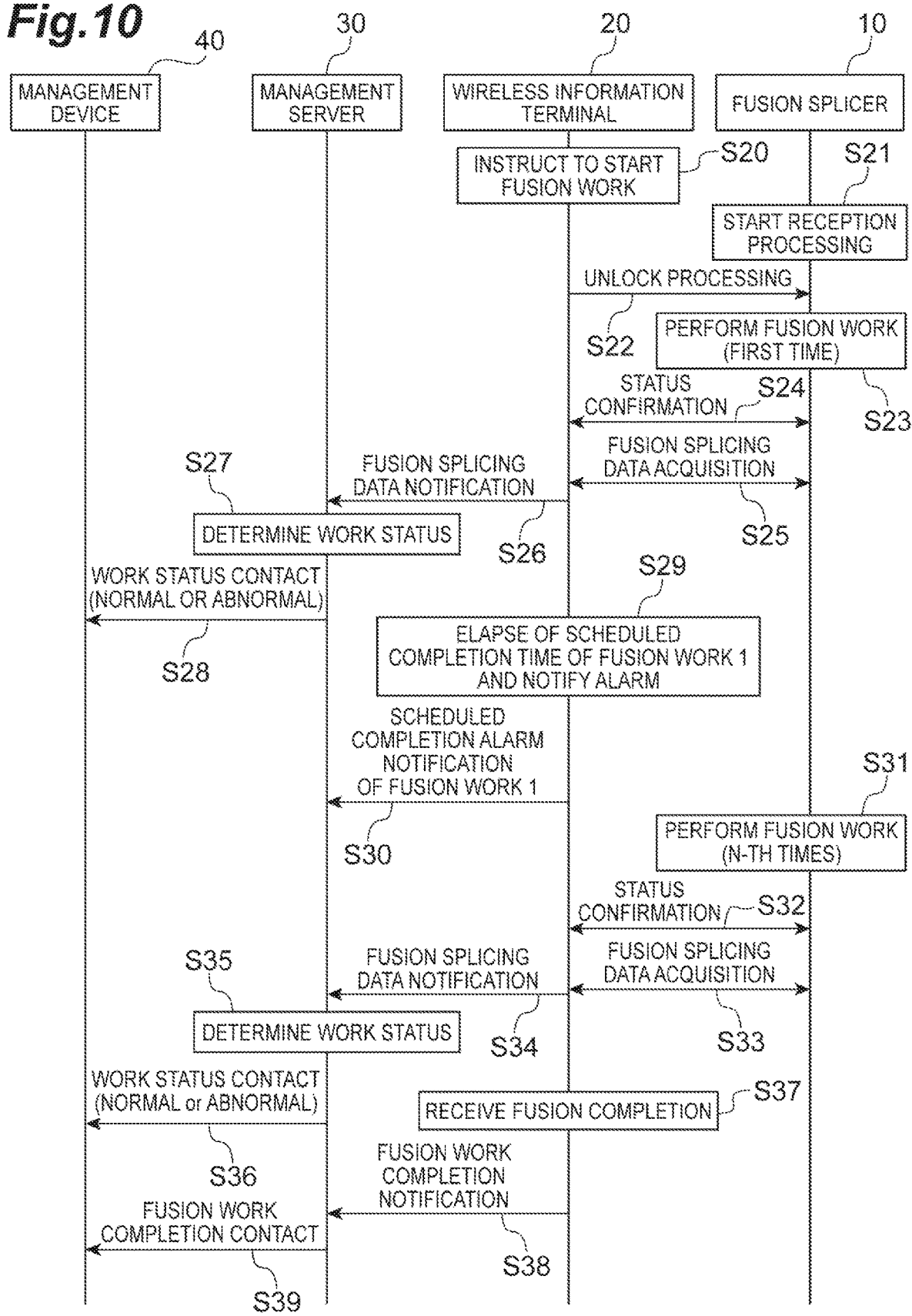

FUSION SPLICING DEVICE MANAGEMENT SYSTEM AND FUSION SPLICING DEVICE MANAGEMENT METHOD

TECHNICAL FIELD

The present disclosure relates to a fusion splicer management system and a fusion splicer management method. This application is based upon and claims the benefit of priority from Japanese Patent Application No. 2018-005734, filed on Jan. 17, 2018, the entire contents of which are incorporated herein by reference.

BACKGROUND ART

Patent Literature 1 discloses a fusion splicer for fusion-splicing optical fibers. The fusion splicer includes a V groove for mounting the optical fibers, an arc discharge electrode and an electrode base for fusing the optical fibers, a microscope or a monitor for monitoring a fusion splicing status of the optical fibers, and a heater for heat-shrinking a reinforcement sleeve that covers a spliced portion of the fused optical fibers.

CITATION LIST

Patent Literature

Patent Literature 1: Japanese Unexamined Patent Publication No. 2012-141357

SUMMARY OF INVENTION

The present disclosure provides a system for managing progress of a fusion splicing work performed by each splicing technician by using a fusion splicer. The management system includes an acquisition unit, a determination unit, and a notification unit. The acquisition unit acquires fusion splicing data regarding the fusion splicing work performed by each splicing technician who uses each fusion splicer whenever each fusion splicing work is performed. The determination unit determines a progress status of each fusion splicing work by comparing the fusion splicing data with work plan data indicating a work plan. The notification unit notifies of the progress status of each fusion splicing work determined by the determination unit.

The present disclosure provides a management method for managing progress of a fusion splicing work performed by each splicing technician by using a fusion splicer. The management method includes acquiring fusion splicing data regarding the fusion splicing work performed by each splicing technician who uses each fusion splicer whenever each fusion splicing work is performed, determining a progress status of each fusion splicing work by comparing the fusion splicing data with work plan data indicating a work plan, and notifying the progress status of each fusion splicing work determined in the determining.

BRIEF DESCRIPTION OF DRAWINGS

FIG. 8 is a diagram illustrating an example of a display screen of project statuses of fusion splicing works in the management system.

FIG. 9 is a sequence diagram illustrating processing for managing progress of the fusion splicing work performed by each splicing technician by using the fusion splicer by the management system illustrated in FIG. 4.

FIG. 10 is a sequence diagram illustrating processing for managing the progress of the fusion splicing work performed by each splicing technician by using the fusion splicer by the management system illustrated in FIG. 4.

DESCRIPTION OF EMBODIMENTS

Figure 1:
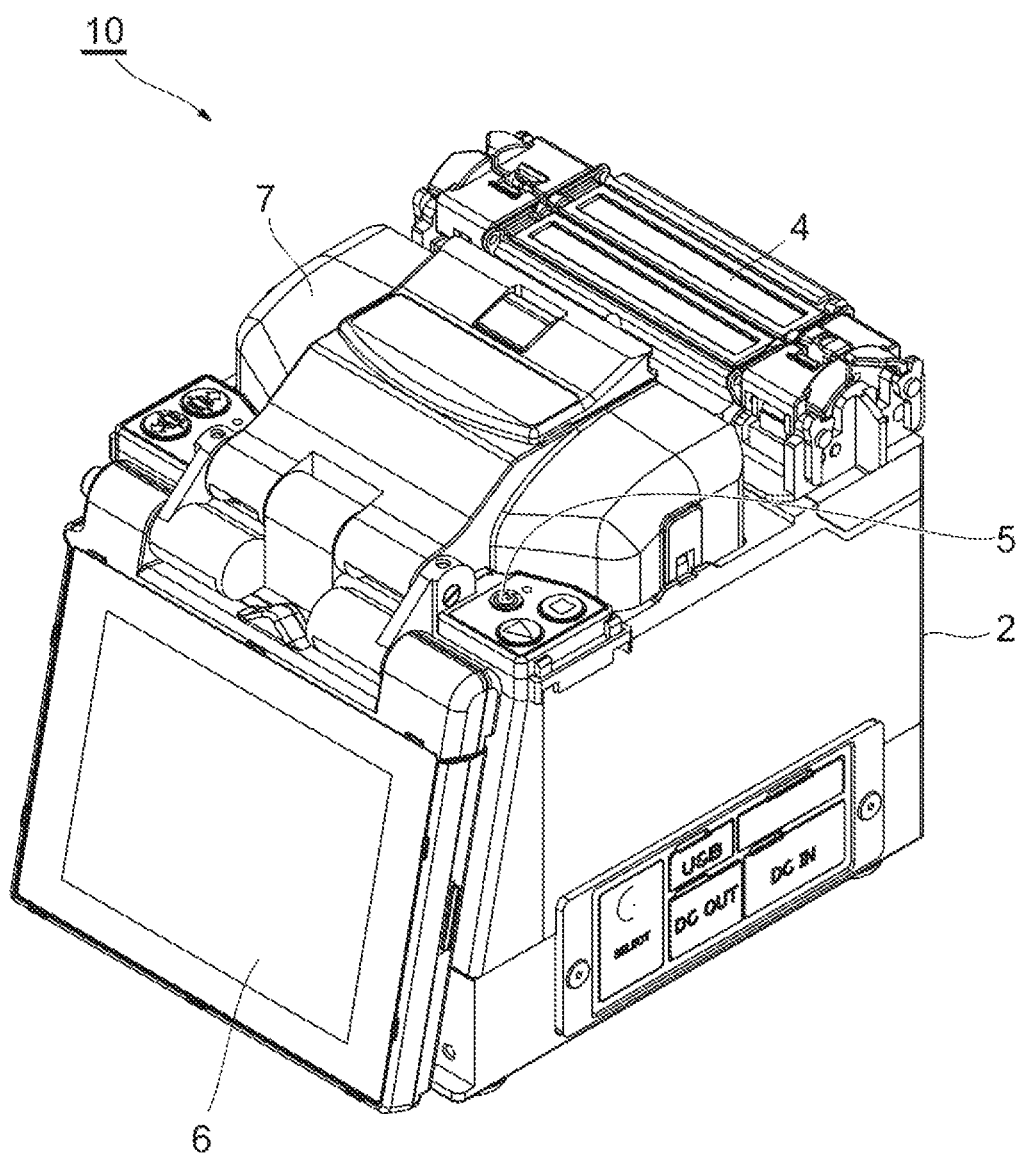
FIG. 1 is a perspective view illustrating an example of a fusion splicer.

Problem to be Solved by the Present Disclosure

At a work site at which the splicing technician performs the fusion splicing work of the optical fibers by using the fusion splicer, the manager may ascertain the progress status of each work site, for example, the delay of the work, after the completion of daily work. When the fusion splicing work at a certain work site is delayed from an initial work plan, the manager cannot know the delay at an early stage, and thus, it can be difficult to remedy the delay of the work at an early stage. Accordingly, even though there is a delay in the progress of the fusion splicing work using the fusion splicer, it is desired that the manager can know the progress status at an early stage.

Advantageous Effects of the Present Disclosure

According to the present disclosure, a progress status of a fusion splicing work can be known an early stage.

Description of Embodiments of the Present Disclosure

First, contents of an embodiment of the present disclosure will be listed and described. An aspect of the present disclosure relates to a system for managing progress of a fusion splicing work performed by each splicing technician by using a fusion splicer. The management system includes an acquisition unit that acquires fusion splicing data regarding the fusion splicing work performed by each splicing technician who uses each fusion splicer whenever each fusion splicing work is performed, a determination unit that determines a progress status of each fusion splicing work by comparing the fusion splicing data with work plan data indicating a work plan, and a notification unit that notifies of the progress status of each fusion splicing work determined by the determination unit.

Another aspect of the present disclosure relates to a management method for managing progress of a fusion splicing work performed by each splicing technician by using a fusion splicer. The management method includes the step of acquiring fusion splicing data regarding the fusion splicing work performed by each splicing technician who uses each fusion splicer whenever each fusion splicing work is performed, a step of determining a progress status of each fusion splicing work by comparing the fusion splicing data with work plan data, and a step of notifying the progress status of each fusion splicing work determined in the step of determining.

In this fusion splicer management system and management method, the fusion splicing data regarding the fusion splicing work is acquired whenever each fusion splicing work is performed. The progress status of each fusion splicing work is determined by comparing the acquired fusion splicing data with the work plan data, and is notified to a predetermined notification destination. Thus, the manager can know the progress status of each fusion splicing work, for example, the delay of the work or the splicing quality, at an early stage. When the delay of the progress of the fusion splicing work or other problems occur, the manager can find the progress status such as the delay of the work at an early stage, and can remedy the delay.

As one embodiment, the determination unit may determine whether or not each fusion splicing work is delayed from the work plan by comparing the fusion splicing data with the work plan data. According to this embodiment, it is possible to know whether or not the fusion work is delayed at an early stage, and it is possible to remedy the delay at an early stage. In this case, the notification unit may notify a management device that manages the work plan, of the progress status of whether or not each fusion splicing work is delayed from the work plan in a predetermined cycle or for each determination of the delay.

As one embodiment, the fusion splicing data may include at least one piece of information of identification information of the used fusion splicer, identification information of the splicing technician who performs the fusion splicing work, a date and time of the fusion splicing, a location at which the fusion splicing is performed, a splicing loss of fusion-spliced optical fibers, an end surface angle of the fusion-spliced optical fibers, an eccentricity of the optical fiber, a splicing condition (discharge heating time or discharge power) selected in the case of the fusion splicing, a determination result of a type of the optical fiber, observation images of an optical fiber before and after the splicing, the number of times of the splicing, a reinforcement condition of the fusion-spliced portion, a time required for reinforcement, and the number of times of the reinforcement. According to this embodiment, the manager can more specifically recognize the progress information of the fusion work, and can more suitably remedy the delay.

As one embodiment, individual wireless information terminals may be assigned to the fusion splicers, respectively, and each fusion splicer may be configured to be able to perform wireless connection with the corresponding wireless information terminal. The work plan data may be stored in a management server capable of communicating with the wireless information terminal via a communication line, and the acquisition unit may be provided in the fusion splicer. The wireless information terminal may transmit the fusion splicing data acquired by the acquisition unit to the management server, and the progress status of each fusion splicing work may be determined by the determination unit provided in the management server. According to this embodiment, it is possible to easily acquire the fusion splicing data from the fusion splicer by using the wireless information terminal that can be arranged in the vicinity of the fusion splicer, and it is also possible to manage the work plan data in the management server at once.

As one embodiment, the management system or the management method may further include a selection unit or a selection step that selects a candidate team of the splicing technician suitable for each work plan. The selection unit or the selection step may select the candidate team suitable for the work plan based on at least one piece of information of a construction period in the work plan data, the scheduled number of times of the splicing of the optical fibers, and a splicing standard of the optical fiber. According to this embodiment, the manager can easily select the work team suitable for each work plan. The candidate team to be selected may be one work team or a plurality of work teams. The work team may be constituted by a plurality of splicing technicians, or may be constituted by one splicing technician.

As one embodiment, the fusion splicer management system may further include a team database that includes splicing technician data used by the selection unit to select the candidate team suitable for the work plan. In this case, the management system or the management method may further include an updating unit or an updating step that adds the fusion splicing data in the fusion splicing work performed according to the work plan to the team database, and updates the team database after the fusion splicing work according to the work plan is completed. Accordingly, it is possible to select the work team more suitable for each work plan.

Any of the aforementioned embodiments can be combined with other embodiments as necessary.

Details of Embodiment of Present Disclosure

Next, specific examples of a fusion splicer management system and a management method thereof according to an embodiment of the present disclosure will be described with reference to the drawings. The present invention is not limited to these examples, but is defined by the scope of the claims. The present invention is intended to include meanings equivalent to the scope of the claims and all modification examples within the scope. In the following description, the same reference signs are given to the same elements in the description of the drawings, and redundant description will be omitted.

Figure 2:
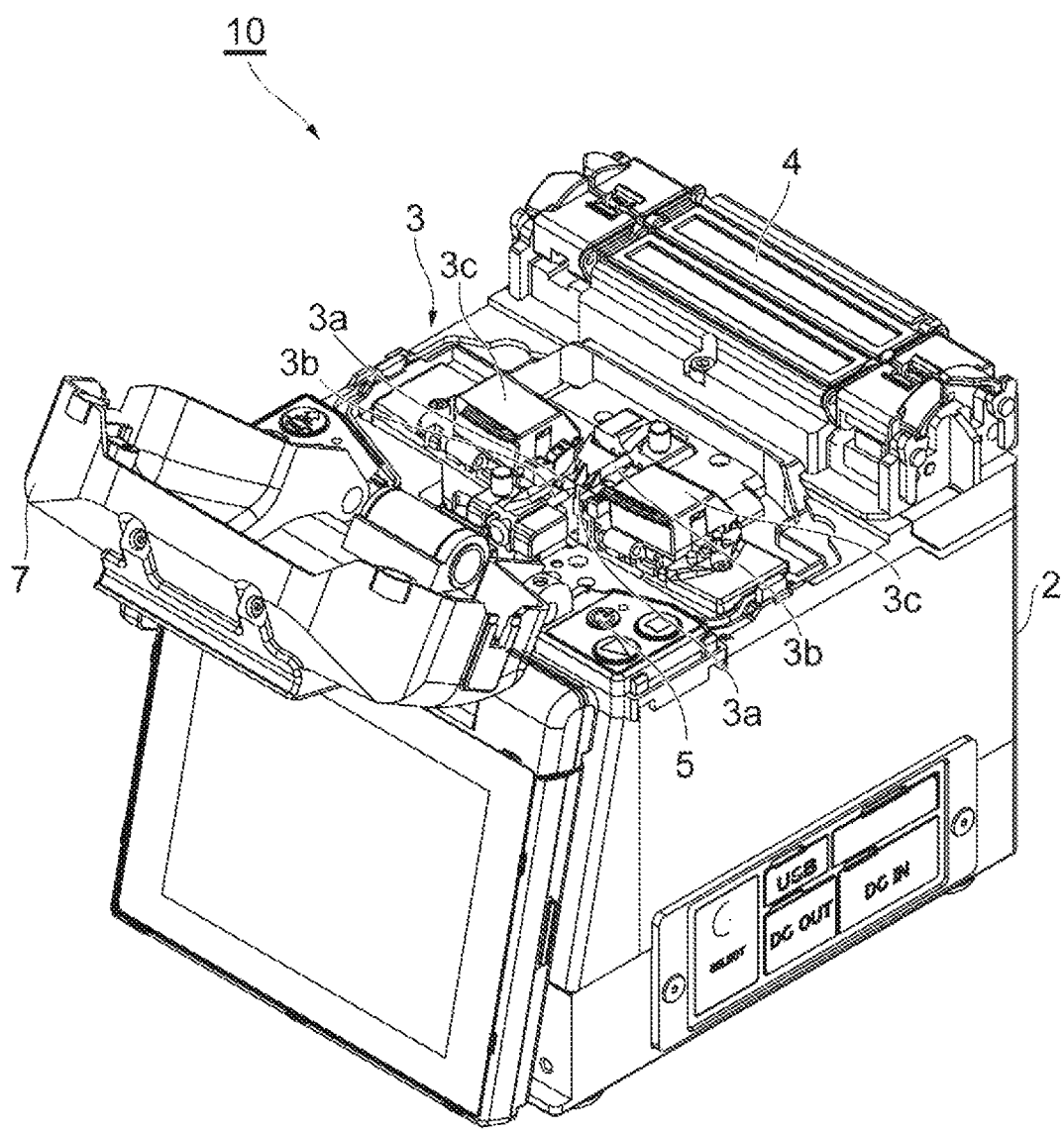
FIG. 2 is a perspective view illustrating an internal structure of the fusion splicer illustrated in FIG. 1.

A fusion splicer 10 that performs a fusion splicing work which is managed by the management system according to the present embodiment will be described with reference to FIGS. 1 and 2. FIGS. 1 and 2 are perspective views illustrating an outer appearance of the fusion splicer, FIG. 1 illustrates the outer appearance of the fusion splicer in a state in which a windshield cover is closed, and FIG. 2 illustrates the outer appearance in a state in which the windshield cover is opened and an internal structure of the fusion splicer is visible. The fusion splicer 10 is a device for fusion-splicing optical fibers, and includes a box-shaped housing 2 as illustrated in FIGS. 1 and 2. A fusion mechanism 3 for fusion-splicing the optical fibers, a heater 4 that heat-shrinks a fiber reinforcement sleeve that covers a fusion-spliced portion of the optical fibers fused by the fusion mechanism 3, and a start button 5 are provided at an upper part of the housing 2. The fusion splicer 10 includes a monitor 6 that displays a fusion-spliced status of the optical fibers captured by a microscope camera (not illustrated) arranged inside the housing 2. It is possible to acquire fusion splicing data such as a cut end surface (end surface angle) of the optical fiber, the eccentricity of the optical fiber, an automatic discrimination result of a fiber type, and an estimated loss (dB) of the spliced optical fiber, from an optical fiber end surface before the splicing and the fusion-spliced status after the splicing captured by the microscope. The fusion splicer 10 includes a windshield cover 7 that prevents the entry of wind into the fusion mechanism 3.

The fusion mechanism 3 has a pair of fiber positioning units 3a, a pair of discharge electrodes 3b, and a holder mounting unit on which a pair of optical fiber holders 3c can be mounted. After the end surface of each optical fiber to be fused is cut in a predetermined angle (end surface angle) range by a splicing technician, each optical fiber is held and fixed to the optical fiber holder 3c, and the optical fiber holder 3c is mounted and fixed on the holder mounting unit. The fiber positioning units 3a are arranged between the optical fiber holders 3c and position tip ends of the optical fibers held by the optical fiber holders 3c. The discharge electrodes 3b are arranged between the fiber positioning units 3a and are electrodes for fusing tip ends of the optical fibers by arc discharge. Although it has been described that in the fusion splicer 10, the fusion splicing of the optical fibers is performed by the aforementioned configuration, the accuracy and work speed of an end surface treatment of the optical fibers and the accuracy and work speed of a fusion splicing process of the optical fibers may be different for each splicing technician who uses the fusion splicer 10, and thus, differences in splicing quality and splicing work speed may be caused. Accordingly, the fusion splicing corresponding to a work plan may not be performed.

Figure 3:
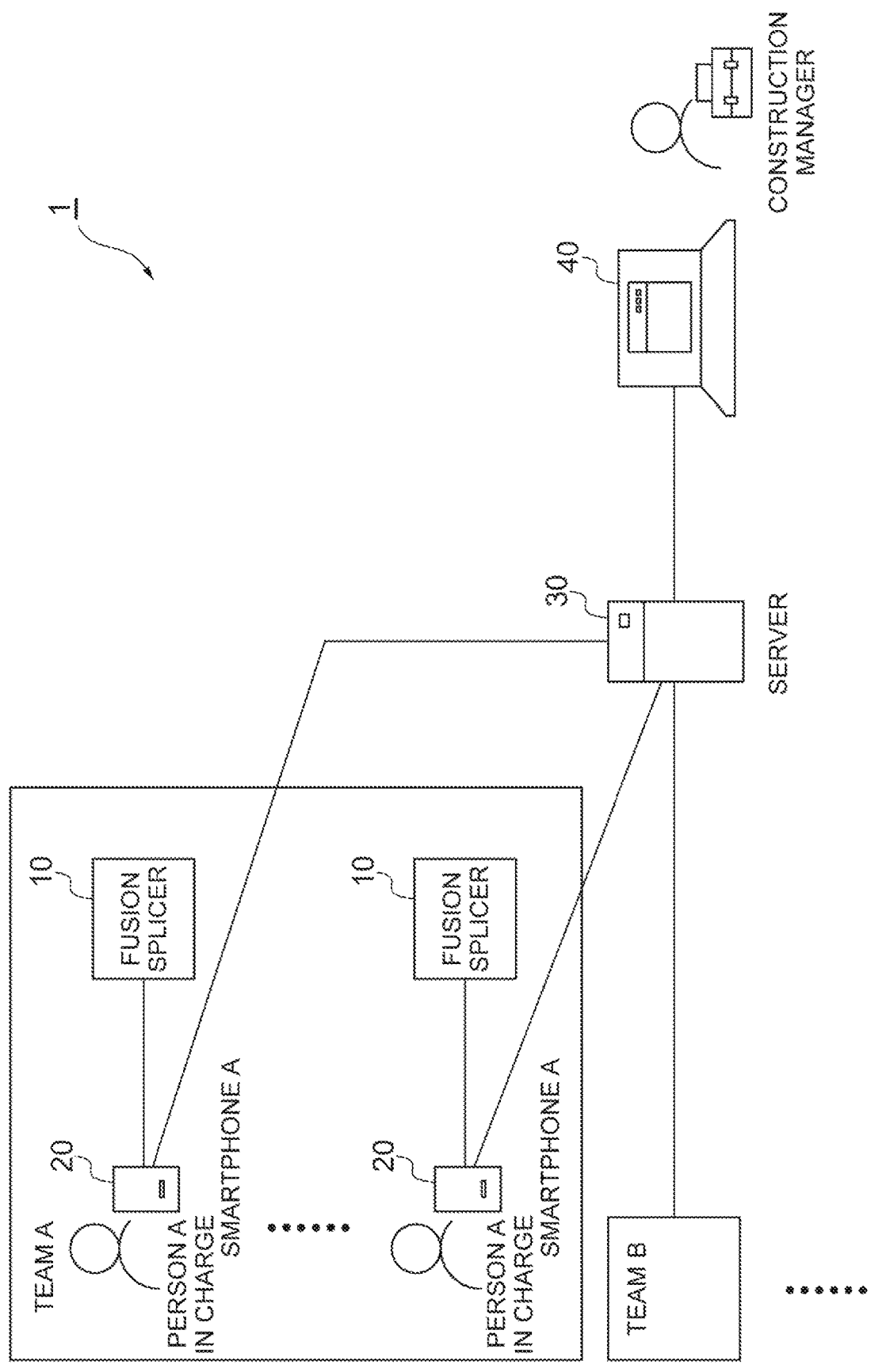
FIG. 3 is a diagram illustrating an outline of an example of a fusion splicer management system.
Figure 4:
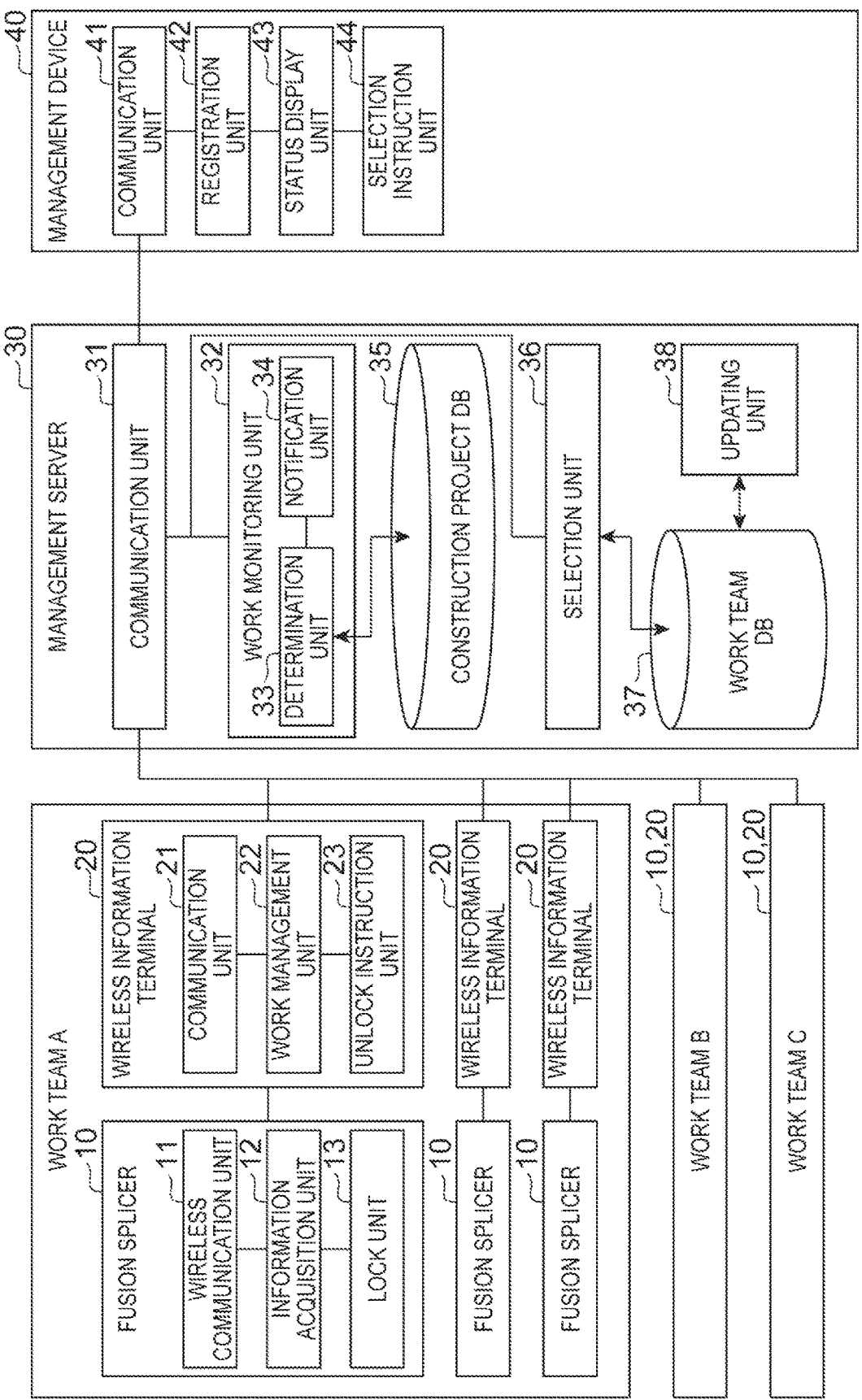
FIG. 4 is a block diagram illustrating an example of a fusion splicer management system.

Next, a configuration of the management system 1 capable of performing progress management of the fusion splicing work when the splicing technician performs the fusion splicing work of the optical fibers by using the fusion splicer 10 according to the work plan will be described with reference to FIGS. 3 and 4. FIG. 3 is a diagram illustrating an outline of an example of the fusion splicer management system. FIG. 4 is a block diagram illustrating an example of the fusion splicer management system. As illustrated in FIGS. 3 and 4, the management system 1 includes a plurality of fusion splicers 10, wireless information terminals 20 individually assigned to the fusion splicers 10, a management server 30, and a management device 40. The fusion splicer 10 is configured to perform wireless communication with an external device in a 2.4 GHz band compliant with, for example, IEEE 802.11, and can be wirelessly connected to the corresponding wireless information terminal 20. The wireless information terminal 20 is, for example, a smartphone, and is connected to the management server 30 via an electric communication line (including a wireless line) such as the Internet. The management device 40 constituted by a personal computer (PC) is also connected to the management server 30 via an electric communication line such as the Internet. As stated above, in the management system 1, the fusion splicers 10, the wireless information terminals 20, the management server 30, and the management device 40 are connected to communicate with each other in a wireless or wired manner, and are configured to transmit and receive various pieces of information such as the fusion splicing data to be described below.

Figure 5:
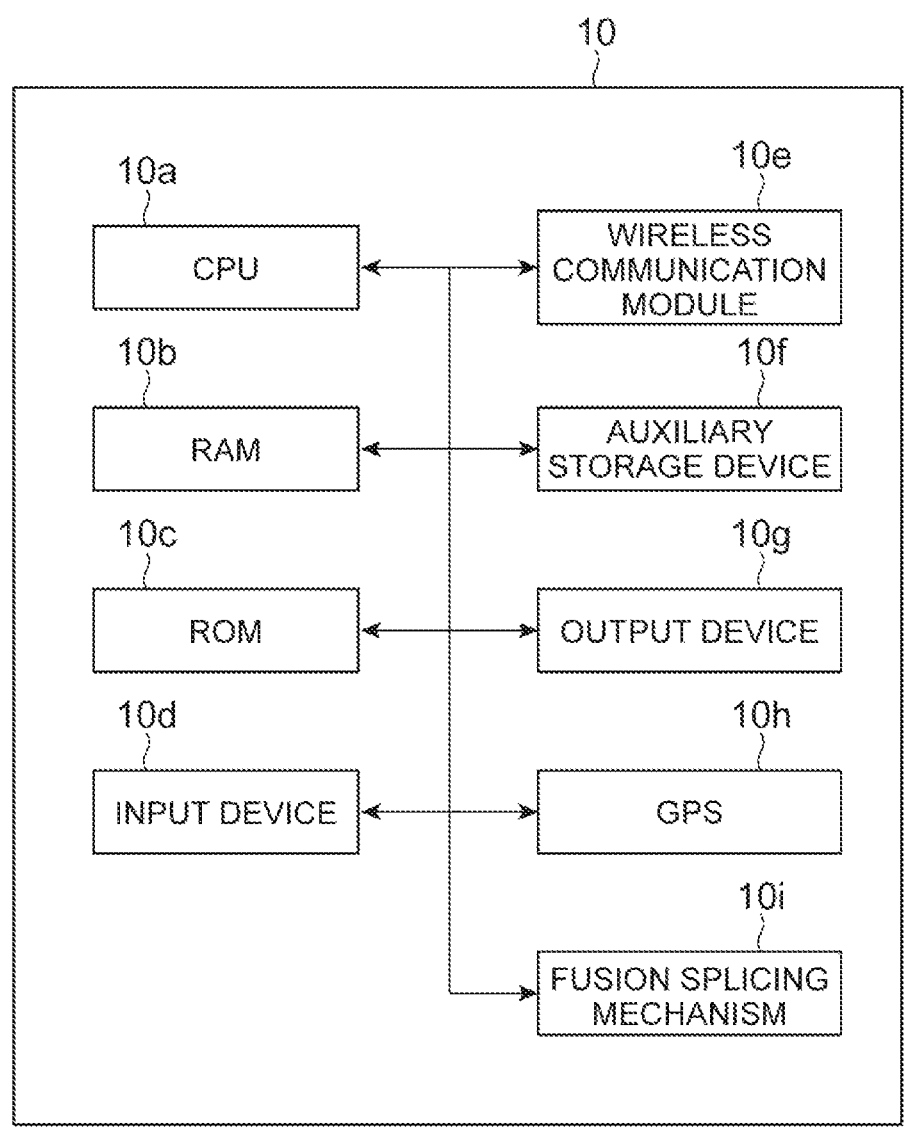
FIG. 5 is a block diagram illustrating a hardware configuration of the fusion splicer illustrated in FIG. 4.

The fusion splicer 10 includes, as control and communication units, functionally, a wireless communication unit 11 to wirelessly communicate with an external device such as the wireless information terminal 20, an information acquisition unit 12 that acquires the fusion splicing data involved in the fusion splicing work performed by the fusion splicer 10 for each work, and a lock unit 13 that locks an operation of the fusion splicer 10. In the management system 1, one work team is constituted by a plurality of (for example, three in the present embodiment) fusion splicers 10 (splicing technicians), and one work project is performed by each work team (work team A, work team B, and work team C). As illustrated in FIG. 5, each of the fusion splicers 10 includes a computer that includes, as control and communication units, control and communication hardware such as a CPU 10a, a RAM 10b, a ROM 10c, an input device 10d, a wireless communication module 10e, an auxiliary storage device 10f, and an output device 10g. Functions of the control and communication units of the fusion splicer 10 are executed by operating these constituent elements by programs. The fusion splicer 10 may include a positional information acquisition device such as a GPS 10h, and may acquire positional information of the fusion splicer 10 such as longitude and latitude by the GPS 10h. The fusion splicer 10 includes various fusion splicing mechanisms 10i, such as the discharge electrodes 3b, other than a control function and a communication function.

The wireless communication unit 11 performs wireless communication with the wireless information terminal 20 (communication unit 21). The wireless communication unit 11 includes, for example, a wireless LAN card, and performs wireless communication in the 2.4 GHz band compliant with IEEE 802.11 with the wireless information terminal 20. The wireless communication unit 11 wirelessly transmits an SSID (identifier) of a wireless access point (wireless AP) unique to each fusion splicer 10. When the wireless information terminal 20 (communication unit 21) receives and recognizes this SSID, a wireless connection between the fusion splicer 10 and the wireless information terminal 20 is established. An example of the SSID is, for example, "T71C_420000001", and an SSID different from that of the other fusion splicer 10 capable of performing wireless communication is assigned, and can be identified for each fusion splicer 10. The wireless communication using the wireless communication unit 11 is not limited to the aforementioned communication standard, and another communication standard may be used.

The information acquisition unit 12 acquires the fusion splicing data regarding each fusion splicing work performed by the fusion splicer 10. The information acquisition unit 12 acquires, as the fusion splicing data, information such as a date and time of the fusion splicing, a location of the fusion splicing, a splicing loss of the fusion-spliced optical fibers, an end surface angle of the optical fibers to be fusion-spliced, the eccentricity of the optical fiber, a splicing condition (discharge heating time and discharge power) selected in the case of the fusion splicing, a discrimination result of the type of the optical fiber, observation images of the optical fiber before and after the splicing, the number of times of the splicing, a reinforcement condition, a time required for reinforcement, or the number of times of the reinforcement when the splicing technician performs the work of fusing the optical fibers by using the fusion splicer 10. The information acquisition unit 12 may acquire, as the fusion splicing data, identification information (the aforementioned SSID or similar identification information) of the fusion splicer 10 used in the fusion splicing work and identification information of the splicing technician who performs the fusion splicing work. Fusion splicing information such as the identification information of the fusion splicer 10 and the identification information of the splicing technician may be acquired by the wireless information terminal 20 to be described below. The information acquisition unit 12 acquires the fusion splicing data for each fusion splicing work using the fusion splicer 10, and transmits the acquired fusion splicing data to the wireless information terminal 20 via the wireless communication unit 11. The transmission of the fusion splicing data to the wireless information terminal 20 using the information acquisition unit 12 may be performed for each fusion splicing work, or may be performed at a predetermined cycle (for example, every predetermined time).

The lock unit 13 temporarily locks or unlocks an operation of the fusion mechanism of the fusion splicer 10. In order to achieve anti-theft, the fusion splicer 10 may have a function of locking the operation of the fusion mechanism of the fusion splicer 10 until an unlock instruction from the wireless information terminal 20 is received after the fusion splicer 10 is started. The lock unit 13 realizes the lock function. When an unlock signal from the wireless information terminal 20 (unlock instruction unit 23) after the fusion splicer 10 is started, the lock unit 13 authenticates the unlock signal, and unlocks the operation of the fusion mechanism of the fusion splicer 10 when the received unlock signal is suitable.

Figure 6:
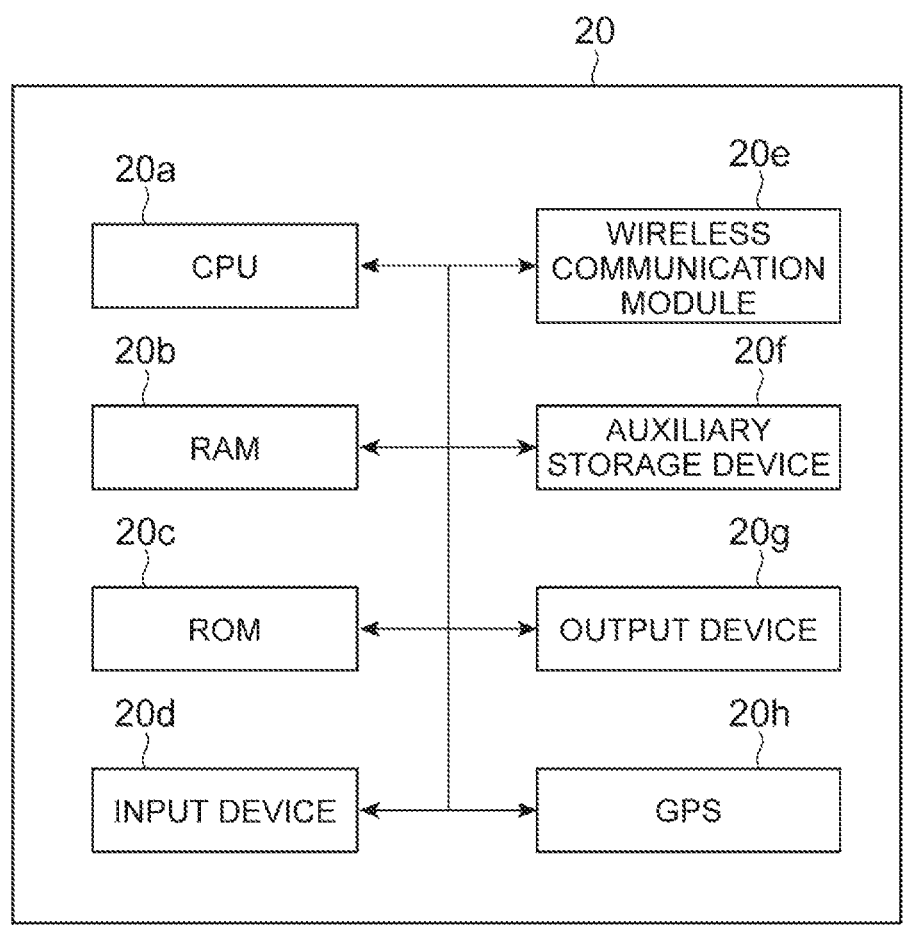
FIG. 6 is a block diagram illustrating a hardware configuration of a wireless information terminal illustrated in FIG. 4.
Figure 7:
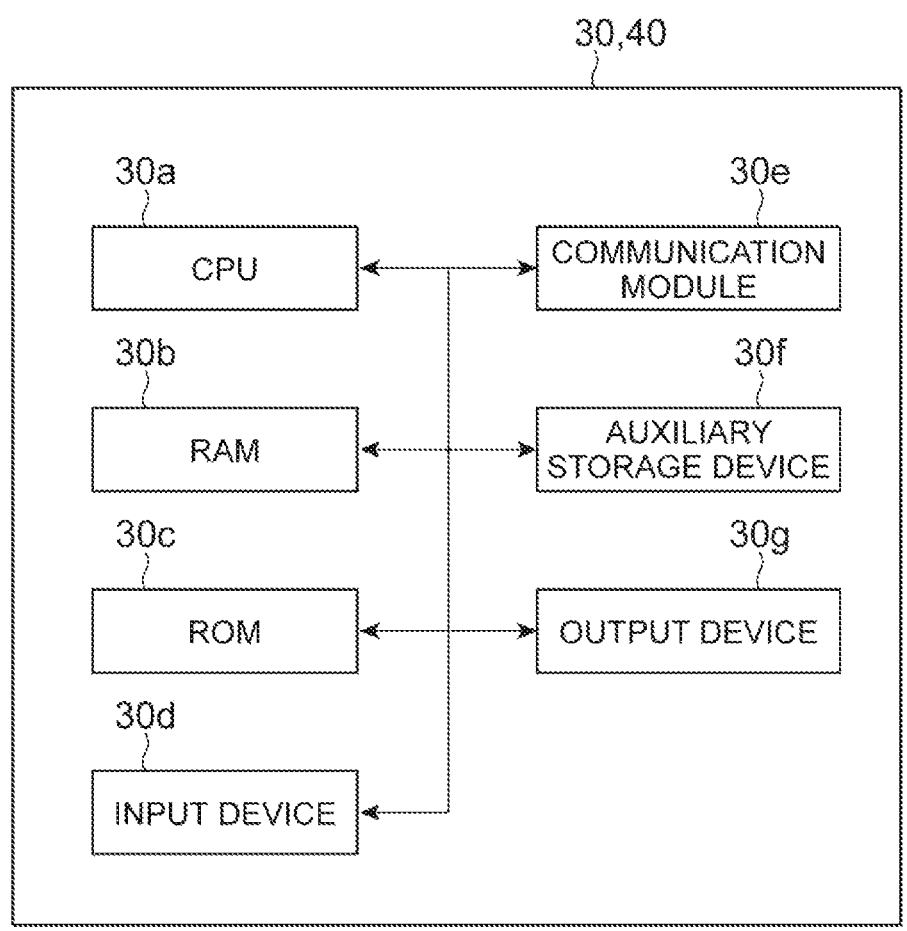
FIG. 7 is a block diagram illustrating hardware configurations of a management server and a management device illustrated in FIG. 4.

The wireless information terminal 20 that receives the fusion splicing data from the fusion splicer 10 includes, for example, a portable wireless communication terminal such as a smartphone or an information terminal such as a personal computer (PC) having a wireless communication function. The wireless information terminal 20 includes a communication unit 21, a work management unit 22, and an unlock instruction unit 23. The unlock instruction unit 23 generates an instruction signal for unlocking the operation of the fusion mechanism of the fusion splicer 10 as described above. The unlock instruction unit 23 transmits the unlock signal for the corresponding fusion splicer 10 to the fusion splicer 10 via the communication unit 21, and unlocks the operation. The unlock signal may include the identification information unique to each wireless information terminal 20 or each splicing technician, and thus, only the specific fusion splicer 10 can be unlocked. As illustrated in FIG. 6, the wireless information terminal 20 includes a computer including hardware such as a CPU 20a, a RAM 20b, a ROM 20c, an input device 20d, a wireless communication module 20e, an auxiliary storage device 20f, an output device 20g, and a GPS 20h. Functions of the wireless information terminal 20 to be described below are executed by operating these constituent elements by programs. The management server 30 and the management device 40 may have the same hardware configuration as illustrated in FIG. 7. Specifically, each of the management server 30 and the management device 40 includes a computer including hardware such as a CPU 30a, a RAM 30b, a ROM 30c, an input device 30d, a wireless communication module 30e, an auxiliary storage device 30f, and an output device 30g.

The communication unit 21 includes, for example, the wireless communication module 20e, and transmits and receives various wireless signals to and from the wireless communication unit 11 of the fusion splicer 10 by wireless communication. The communication unit 21 includes, for example, a wireless LAN module incorporated in the terminal, and performs communication in the 2.4 GHz band compliant with, for example, IEEE 802.11 so as to correspond to the wireless standard of the wireless communication unit 11. The communication unit 21 receives the SSID (identifier) individually assigned to each fusion splicer from the fusion splicer 10 from the wireless signal, and establishes wireless communication with the wireless communication unit 11 by authenticating the SSID. The communication unit 21 acquires the fusion splicing data acquired by the information acquisition unit 12 of the fusion splicer 10 via the wireless communication unit 11. The communication unit 21 is also connected to the management server 30 via a communication line (including a wireless line or the Internet) such as 4G (LTE), and transmits and receives various pieces of data and signals to and from the management server 30.

The work management unit 22 manages the progress of the work project of the fusion splicing work assigned to each work team in the wireless information terminal 20 in cooperation with a work monitoring unit 32 of the management server 30. The work management unit 22 performs start instructions of various works before the fusion splicing and notification (alarm notification) of a scheduled completion time, transmission of each fusion splicing data transmitted from the fusion splicer 10 to the management server 30, and start instruction of the fusion splicing work and notification (alarm notification) of the scheduled completion time, along with the work project for each work team assigned from the management server 30.

The management server 30 that receives the fusion splicing data regarding the fusion splicing work performed by the splicing technician from the wireless information terminal 20 includes a communication unit 31, the work monitoring unit 32 including a determination unit 33 and a notification unit 34, a construction project DB 35, a selection unit 36, a work team DB 37, and an updating unit 38. The communication unit 31 corresponds to the communication unit 21, and transmits and receives information to and from the communication unit 21 of the wireless information terminal 20 via an electric communication line including a wireless line (including 4G) and the internet line. The communication unit 31 also corresponds to a communication unit 41 of the management device 40, and transmits and receives information to and from the communication unit 41 of the management device 40 via an electric communication line.

The work monitoring unit 32 includes the determination unit 33 and the notification unit 34, and monitors whether or not each work team constituted by one or the plurality of fusion splicers 10 makes progress on the fusion splicing work according to a work plan of a construction project assigned in advance. When the fusion splicing data regarding each fusion splicing work in the fusion splicer 10 is acquired via the wireless information terminal 20, the determination unit 33 of the work monitoring unit 32 compares the time and location of the fusion splicing and the quality (splicing loss) of the fusion splicing included in the fusion splicing data with work plan data of a predetermined construction project stored in the construction project DB. The determination unit 33 determines whether or not the progress of the fusion splicing work is delayed from the work plan and whether or not the splicing quality (the estimated loss or the end surface angle of the splicing) of the fusion-spliced optical fibers satisfies a desired requirement. The determination unit 33 may determine only one of the delay of the fusion splicing work or the splicing quality.

When the determination unit 33 determines that the fusion splicing work of a certain work team is delayed from the work plan or the splicing quality does not satisfy the desired quality, the notification unit 34 notifies the management device 40 of information indicating that the fusion splicing work is delayed or the splicing quality does not satisfy the desired quality (abnormal information) via the communication unit 31. Meanwhile, when it is determined that the fusion splicing work of a certain work team is performed according to the work plan or the splicing quality satisfies the desired quality, the notification unit 34 notifies the management device 40 of information indicating that the fusion splicing work is performed according to the work plan or the splicing quality satisfies the desired quality (normal information) via the communication unit 31. The determination of the work status performed by the determination unit 33 may be performed whenever the fusion splicing data is acquired from each fusion splicer 10, or may be performed in a predetermined cycle, for example, every hour. Accordingly, a manager who uses the management device 40 can know the delay of the fusion splicing work performed by each work team and deterioration of the splicing quality at an early stage or in real time. FIG. 8 illustrates an example of a list screen in which the management device 40 summarizes the splicing time and splicing quality for each project. In FIG. 8, splicing for which the estimated loss does not satisfy a desired value is colored, for example, displayed in red or yellow, and the manager who sees this screen on the management device 40 can easily know the splicing in an abnormal status.

Now, referring back to FIG. 4, the description will be continued. When there is a certain construction project, the selection unit 36 selects a work group, which is a group of splicing technicians, to be assigned to the construction project from past work results. When a selection request for a work team for a certain construction project is received from a selection instruction unit 44 of the management device 40, the selection unit 36 accesses the work team DB 37 in which information such as a current schedule of the fusion splicing work in each work team, the number of times (actual result) of the fusion splicing, a construction period (actual result) of the fusion splicing, and the splicing quality of the fusion splicing is summarized for each work team, and selects, as a candidate, the work team matching the splicing condition, which is delivery date and quality, of the construction project. In the case of this selection, the selection unit 36 may select one work team, or may select a plurality of work teams. The selection unit 36 notifies the management device 40 of the selected candidate of the work team to notify the manager.

After the fusion splicing work according to the work plan is completed, the updating unit 38 adds the fusion splicing data performed according to the work plan to the work team DB 37, and updates the information of the work team DB 37. The updating unit 38 adds, as information indicating the skill and experience of each splicing technician, each fusion splicing data to the existing information in association with each fusion splicing data with an identification number indicating the splicing technician who performs each fusion splicing work. Accordingly, the selection of a suitable work team using the work team DB 37 becomes more suitable.

The management device 40 is a general device such as a personal computer, and includes a communication unit 41, a registration unit 42, a status display unit 43, and a selection instruction unit 44. The communication unit 41 has a function of performing general Internet communication, and establishes communication between the management server 30 and the management device 40.

The registration unit 42 registers the construction project in the construction project DB 35 of the management server 30. The registration unit 42 registers a construction project name, a construction period of this construction project, the scheduled number of times of the splicing of the optical fibers, the splicing standard (desired splicing quality), and a team in charge in association with the identification information of the manager who manages the management device 40 in the construction project DB 35.

The status display unit 43 displays the progress status of the construction project registered by the registration unit 42 on a monitor of the management device 40. The manager can know at an early stage when a work delay occurs in the construction project by displaying the progress status by the status display unit 43. Accordingly, the manager can remedy the delay of the fusion splicing work by reorganizing the team(s) such as increasing the number of splicing technicians as necessary. FIG. 8 illustrates a display example of the status display unit 43.

When the construction project is registered in the management server 30, the selection instruction unit 44 instructs the management server 30 to perform select processing of the work team in charge. When the selection instruction unit 44 requests the selection processing of the work team, the management server 30 selects the work team suitable for a certain construction project by the selection unit 36 and the work team DB 37 as described above, and a selection result is notified to the management device 40.

Figure 11:
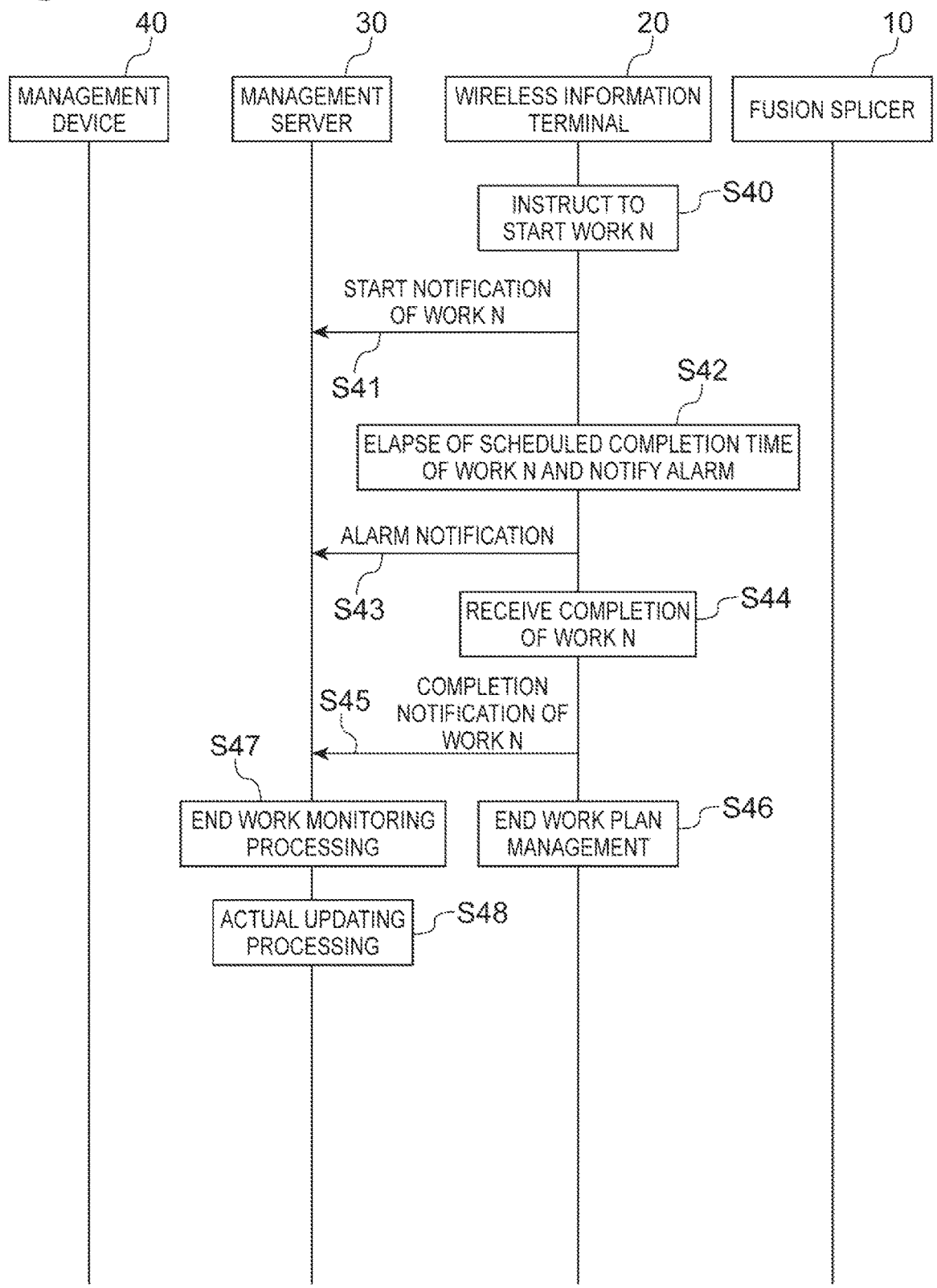
FIG. 11 is a sequence diagram illustrating processing for managing the progress of the fusion splicing work performed by each splicing technician by using the fusion splicer by the management system illustrated in FIG. 4.
Figure 12:
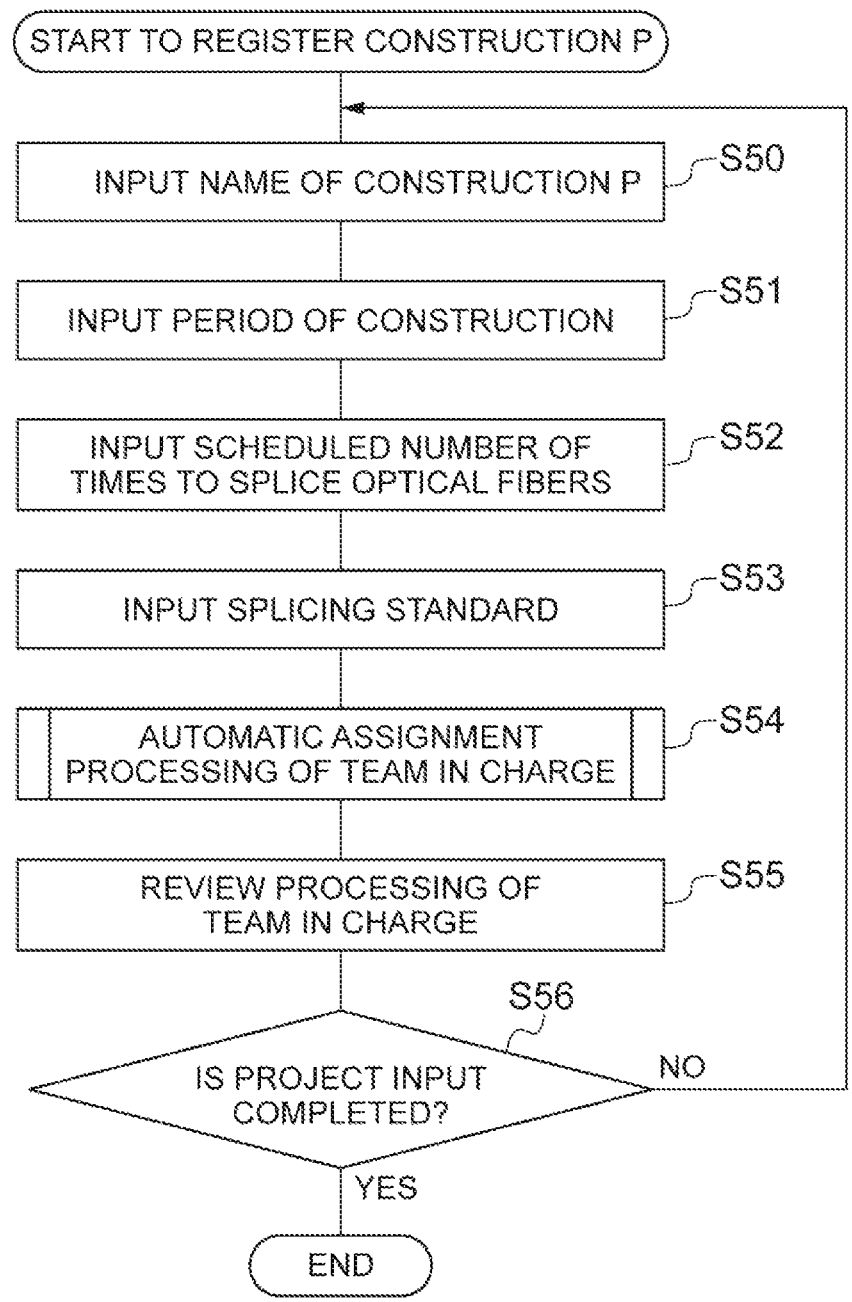
FIG. 12 is a flowchart illustrating a processing flow of construction project registration in the sequence diagram of FIG. 9.
Figure 13:
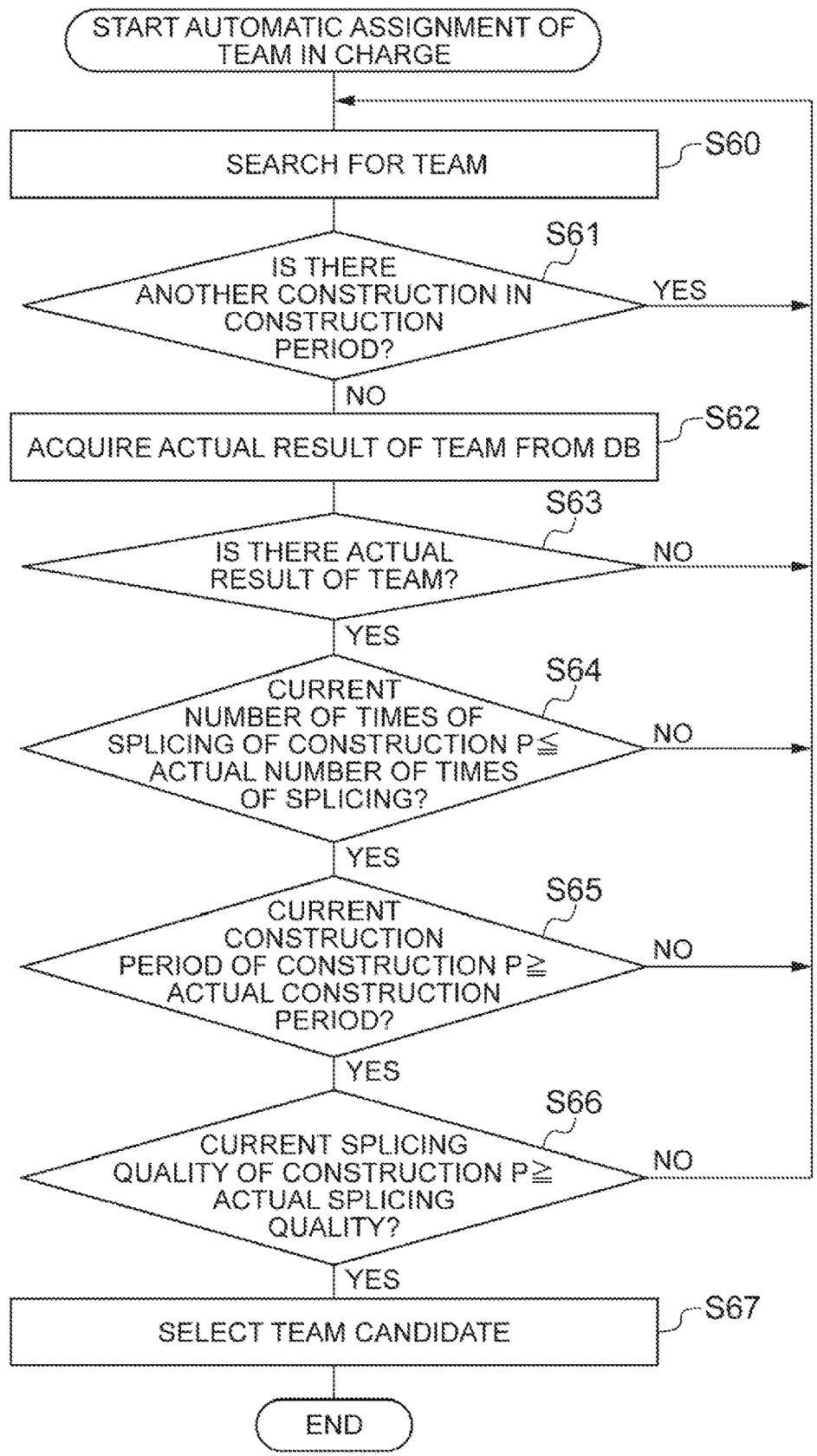
FIG. 13 is a flowchart illustrating a processing flow of automatic assignment of a team in charge in the construction project registration processing illustrated in FIG. 12.

Next, a method of managing the progress of the fusion splicing work by each work team, for example, work team A, by using the management system 1 having the aforementioned configuration will be described with reference to FIGS. 9 to 13. FIGS. 9 to 11 are sequence diagrams illustrating processing for managing the progress of the fusion splicing work performed by each splicing technician by using the fusion splicer 10 by the management system 1. FIG. 12 is a flowchart illustrating a processing flow of the construction project registration in the sequence diagram of FIG. 9. FIG. 13 is a flowchart illustrating a processing flow of automatic assignment of the team in charge in the construction project registration processing illustrated in FIG. 12.

As illustrated in FIG. 9, the manager operates the management device 40, and the manager performs user registration of a worker, who is a splicing technician. An ID, a password, and years of work experience of a user, and types of fusing devices that can be handled are registered as information on the user. This step is performed when a worker is newly registered (step S1). Subsequently, the manager performs team registration processing of the work team to be managed. A team name is input as team information, and a team leader and team members are selected and registered from among users (splicing technicians) who are registered as users. This step is performed when a team is newly created or when the team name, leader, or members are changed (step S2). Subsequently, registration processing of the construction project (step S3) is performed on the management server 30. In the user registration processing of the manager in step S1, the manager who collectively manages a plurality of construction projects performs user registration on the management server 30. In the team registration processing of step S2, the information of each work team managed by the manager, such as, information on the splicing technician to belong to and the fusion splicer to be used, is registered in the work team DB 37 of the management server 30 in association with the user information, which is identification information, of the manager. In the construction project processing in step S3, a construction project (AA project, BB project, or CC project illustrated in FIG. 8) for which the work monitoring is desired by the manager is registered.

In the management server 30 that receives a registration request of the construction project in step S3, the processing proceeds to step S4, and performs the registration processing of the construction project in the construction project DB 35. For example, as illustrated in FIG. 12, in this registration processing of the construction project, input processing of the construction project name is first performed (step S50), and then input processing of the construction period of the construction project (step S51), input processing of the scheduled number of times of the splicing of the optical fibers in the construction project (step S52), input processing of the splicing standard (splicing quality) (step S53), and selection and automatic assignment processing of the work team in charge of the construction project (steps S54 and S55) are performed.

In the input processing of the construction period in step S51, for example, information such as a construction period, a construction start date, and a construction end date for a certain fusion splicing work is registered in the construction project DB 35 in association with each construction project name. In the input processing of the scheduled number of times of the splicing of the optical fibers in step S52, for example, information such as the total scheduled number of times, for example, 100 times, 200 times, or 500 times, of the fusion splicing in a certain fusion splicing work is registered in the construction project DB 35 in association with each construction project name. In the input processing of the splicing standard of step S53, for example, information regarding the splicing quality such as an allowable range (0.02 dB or less, 0.03 dB or less, or 0.05 dB or less) of the estimated loss of the fusion-spliced optical fibers in a certain fusion splicing work or an allowable range (for example, 0.5 degrees or less or 3.5 degrees or less) of the end surface angle of the fusion-spliced optical fibers is registered in the construction project DB 35 in association with each construction project name.

For the automatic assignment processing of the team in charge in step S54, the selection unit 36 of the management server 30 selects the work team suitable for a certain construction project by the selection processing illustrated in FIG. 13, for example. Specifically, as illustrated in step S60, the process of team search is first started, one work team is selected, and it is determined whether or not another construction is assigned to the work team in the construction period in which the fusion splicing work is performed (step S61). When another construction is already assigned to this team, the processing returns to step S60, another team is selected, and the same processing is repeated. Meanwhile, when it is determined that another construction is not assigned to this work team, the processing proceeds to step S62, and actual result data of the work team, such as, the number of times of past fusion splicing, the construction period in which the fusion splicing is performed, and the splicing quality (estimated loss or end surface angle) of the fusion splicing fusion, is acquired from the work team DB 37.

When the processing for acquiring the actual result of the work team from the work team DB 37 is completed, the processing proceeds to step S63, and it is determined whether or not the actual result of the work team is acquired. When the actual result is acquired, the processing proceeds to step S64, and the number of times of the fusion splicing in the current construction project is compared with the actual number of times of the fusion splicing. When the actual number of times of the fusion splicing is greater in the comparison of step S64, the processing proceeds to step S65. Meanwhile, when the determination results of steps S63 and S64 are No, the processing returns to step S60, and the comparison with another team is continued.

When it is determined in step S64 that the actual number of times of the fusion splicing is greater, the construction period of the current construction project is compared with the actual construction period. The term of the construction period mentioned herein means the number of days required for an optical fiber laying construction. When the actual construction period is shorter than the current construction period in the comparison of step S65, the processing proceeds to step S66. In step S66, the splicing quality of the current construction project and the actual splicing quality are compared. When the actual splicing quality is higher than the current splicing quality in comparison with step S66, the processing proceeds to step S67, and the team is selected as a candidate team. The splicing loss and the end surface angle are compared as the splicing quality in the quality comparison in step S66, and when numerical values thereof in the actual quality are lower than numerical values required in the current construction project, it is determined that the actual splicing quality is higher than the current splicing quality. Meanwhile, when it is determined that the determination results of steps S65 and S66 are No, the processing returns to step S60, and the comparison with another team is performed. As described above, the work team suitable for a certain construction project is selected, and is registered as the work team in charge of this project in the construction project DB 35 of the management server 30 in association with the construction project name.

Here, referring back to FIG. 9, the description will be continued. When the registration processing of the construction project in step S4 is completed, the splicing technician who performs the fusion splicing work starts an application that manages the work plan of the fusion splicing work installed on the wireless information terminal 20 (step S5), and reception processing of a user input is performed by the splicing technician (step S6). Information on the work team already registered includes the identification information indicating each splicing technician who belongs to the work team, and this identification information is used for authenticating the splicing technician. When the splicing technician inputs the identification number (password as necessary) assigned to each splicing technician to the wireless information terminal 20, the information is transmitted to the management server 30, and processing of user authentication process requested (step S7). The management server 30 determines whether or not the splicing technician belongs to the work team registered in the construction project DB 35 based on the identification information, and when the authentication succeeds, an authentication completion notification is sent to the wireless information terminal 20 (step S8). Although only an example of the authentication of one wireless information terminal 20 (one splicing technician) has been described in FIG. 9, the same user authentication processing is performed in the wireless information terminal 20 assigned to each splicing technician belonging to the work team.

When the user authentication processing for all the splicing technicians (for example, 3 persons) belonging to the work team is completed, monitoring processing of the work management of the fusion splicing in the registered construction project is performed by the work monitoring unit 32 of the management server 30 (step S9). When the monitoring work is started, the work monitoring unit 32 first transmits information including the work plan in the construction project to each wireless information terminal 20 belonging to the work team, and the work management unit 22 acquires the information. The work management unit 22 that acquires the information including the work plan starts the management processing of the work plan in each wireless information terminal 20 (step S11), and notifies the work monitoring unit 32 of the management server 30 that the work is started (step S12). Accordingly, the work monitoring unit 32 recognizes that the fusion splicing work in the construction project is started.

Subsequently, the wireless information terminal 20 performs a voice announcement or a screen display for instructing the splicing technician to start a work 1 including the end surface treatment of the optical fiber to be fusion-spliced and other pretreatment works (step S13), and notifies the work monitoring unit 32 of the management server 30 that the work 1 is started (step S14). When the start information of the work 1 is notified, the work monitoring unit 32 may transmit information indicating that the work is started to the management device 40.

Subsequently, when a predetermined time elapses after a start instruction of the work 1 is transmitted and a scheduled completion time of the work 1 comes, an alarm notification is performed, and the splicing technician who holds the wireless information terminal 20 at a work site is notified that the scheduled completion time of the work 1 comes (step S15). The work monitoring unit 32 of the management server 30 is notified of an alarm indicating that the scheduled completion time of the work 1 comes (step S16). Thereafter, when an input indicating that the work 1 is completed is performed on the wireless information terminal 20 by the splicing technician, the input is received (step S17), and the work monitoring unit 32 is notified of the completion of the work 1 (step S18). The work monitoring unit 32 determines that the work 1 is surely completed by the completion notification. In the wireless information terminal 20, when the work 1 is completed earlier than the scheduled completion time of the work 1, the splicing technician may input a notification indicating that the work 1 is completed earlier than the scheduled completion time. In this case, the alarm notification processing with the passage of the scheduled completion time of work 1 may be omitted.

Subsequently, when the work 1 is completed, the processing proceeds to step S20 illustrated in FIG. 10, and the work management unit 22 of the wireless information terminal 20 performs a voice announcement or a screen display for instructing the splicing technician to start the fusion splicing work. When this instruction is received, the splicing technician starts the fusion splicer 10 (step S21), and transmits the signal for unlocking the operation of the fusion splicing mechanism of the fusion splicer 10 by the unlock instruction unit 23 of the wireless information terminal 20 to the fusion splicer 10 (step S22). The splicing technician performs the fusion splicing work (first time) of the optical fibers by using the fusion splicer 10 of which the operation is unlocked by the lock unit 13 that receives the unlock signal (step S23).

When the fusion splicing work is performed by the fusion splicer 10, a status is confirmed for the fusion splicer 10 from the wireless information terminal 20 (step S24), the fusion splicing data in the fusion splicer 10 is acquired by the information acquisition unit 12, and is transmitted to the work management unit 22 of the wireless information terminal 20 (step S25). Examples of the fusion splicing data acquired by the fusion splicer 10 include information such as the date and time of the fusion splicing, the location of the fusion splicing, the splicing loss of the fusion-spliced optical fiber, and the end surface angle of the fusion-spliced optical fibers. As the fusion splicing data that can be added to these pieces of information by the wireless information terminal 20, there is information such as the identification information of the fusion splicer 10 that performs the fusion splicing and the identification information of the splicing technician. The information on the date, time, and place of the fusion splicing may be added by the wireless information terminal 20. The work management unit 22 of the wireless information terminal 20 that acquires the fusion splicing data notifies the work monitoring unit 32 of the management server 30 of the acquired information in association with the construction project name (step S26).

The work monitoring unit 32 of the management server 30 that acquires the fusion splicing data which is the data of the individual fusion splicing works from the wireless information terminal 20 determines whether the work status in the fusion splicing is normal or abnormal by the determination unit 33 (step S27). For example, in the determination of the determination unit 33, when the splicing work is delayed from the work plan in the registered project or the splicing quality does not satisfy the required splicing quality, it is determined that the work status is abnormal. Meanwhile, for example, when the splicing work is performed according to the work plan in the registered project or the splicing quality satisfies the required splicing quality, it is determined that the work status is normal. The notification unit 34 of the work monitoring unit 32 of the management server 30 notifies the management device 40 of the determination result (normal or abnormal) by the determination unit 33, and notifies the manager the determination result by the status display unit 43 (step S28). FIG. 8 is an example of a screen summarizing such notifications.

Subsequently, when a predetermined time elapses from the start instruction of the fusion splicing work and the scheduled completion time of the fusion splicing work (first time) comes, an alarm is notified, and the splicing technician is notified that the scheduled completion time comes (step S29). An alarm indicating that the scheduled completion time of the fusion splicing work (first time) comes is notified to the work monitoring unit 32 of the management server 30 (step S30). A scheduled completion alarm (advance notification alarm) may be notified at a preset time before the scheduled completion time. Thereafter, as necessary, the fusion splicing work (n-th time) and the notification of the fusion splicing data are similarly performed (steps S31 to S34), the work information determination in the management server 30 and the notification to the management device 40 are performed (steps S35 to S36). In the wireless information terminal 20, when the splicing work is completed earlier than the scheduled completion time of the fusion splicing work, the splicing technician may input the notification indicating that the splicing work is completed earlier than the scheduled completion time. In this case, the alarm notification associated with the passage of the scheduled completion time may be saved.

When the fusion splicing work is completed, the wireless information terminal 20 receives the completion by the splicing technician, and notifies the work monitoring unit 32 of the management server 30 of the completion of the fusion splicing work (step S38). The work monitoring unit 32 of the management server 30 notified of the completion of the fusion splicing work reports to the management device 40 that the fusion splicing work involved in the work 1 is completed (step S39).

Subsequently, as illustrated in FIG. 11, the subsequent work (work N (N is an integer of 2 or more)) included in the registered work project is performed similarly to the work 1 (steps S40 to 43), and when all the works N to be required are completed, the wireless information terminal 20 receives the input indicating that the work N is completed by the splicing technician (step S44). The wireless information terminal 20 that receives the input indicating that all the works are completed reports to the work monitoring unit 32 of the management server 30 that all the works are completed (step S45). After these reports are performed, the progress management of the work project by the work management unit 22 of the wireless information terminal 20 and the progress management (work monitoring) of the work project by the work monitoring unit 32 of the management server 30 are ended (steps S46 and S47). The management server 30 may notify the management device 40 of information indicating that all the fusion splicing works are ended.

After all the fusion splicing works are completed, the management server 30 adds each fusion splicing data in the present work project to the work team DB 37 in association with the work team in order to select the next work team, and updates the contents of work team DB 37 by the updating unit 38. Accordingly, it is possible to select a more suitable work team when the work team is selected next time.

As described above, the management system 1 according to the present embodiment acquires the fusion splicing data regarding the fusion splicing work by the fusion splicer 10 and the wireless information terminal 20 corresponding thereto whenever each fusion splicing work is performed. The management system 1 determines the progress status of each fusion splicing work by comparing the acquired fusion splicing data with the work plan data in the management server 30, and notifies the management device 40 of the determination result at any time. Thus, the manager can know the progress status of each fusion splicing work, for example, the delay of the work or the deterioration of the splicing quality, at an early stage. When the progress of the fusion splicing work is delayed, the manager can find the progress status such as the delay of the work at an early stage, and can remedy the progress status, for example, by increasing in the number of splicing workers.

In the management system 1, the determination unit 33 determines whether or not each fusion splicing work is delayed from the work plan by comparing the fusion splicing data with the work plan data. Thus, it is possible to know whether or not the fusion work is delayed at an early stage, and it is possible to remedy the delay at an early stage. In this case, the notification unit 34 may notify the management device 40 that manages the work plan of the progress status of whether or not each fusion splicing work is delayed from the work plan in a predetermined cycle or for each determination of the delay.

In the management system 1, the fusion splicing data includes at least one piece of information of the identification information of the used fusion splicer 10, the identification information of the splicing technician who performs the fusion splicing work, the date and time of the fusion splicing, the location at which the fusion splicing is performed, the splicing loss of the fusion-spliced optical fibers, or the end surface angle of the fusion-spliced optical fibers. Since the fusion splicing data includes such specific information, the manager can more specifically recognize the progress information of the fusion work, and can more suitably remedy the delay.

In the management system 1, the individual wireless information terminals 20 are assigned to the fusion splicers 10, and each fusion splicer 10 is configured to be able to perform wireless connection with the corresponding wireless information terminal 20. The work plan data is stored in the management server 30 that can communicate with the wireless information terminal 20 via a communication line, and the information acquisition unit 12 is provided in the fusion splicer 10. The wireless information terminal 20 acquires the fusion splicing data acquired by the information acquisition unit 12 from the fusion splicer 10 (a part of the fusion splicing data is additionally acquired by the wireless information terminal 20), and transmits the acquired fusion splicing data to the management server 30. The determination unit 33 provided in the management server 30 determines the progress status of each fusion splicing work based on the transmitted fusion splicing data. As described above, the management system 1 can easily acquire the fusion splicing data from the fusion splicer 10 by using the wireless information terminal 20 that can be arranged in the vicinity of the fusion splicer 10, and can also manage the work plan data in the management server 30 at once.

The management system 1 further includes the selection unit 36 that selects the candidate team of the splicing technicians suitable for each work plan. The selection unit 36 selects the candidate team suitable for the work plan based on at least one kind of information of the construction period, the scheduled number of times of the splicing of the optical fibers, and the splicing standard of the optical fiber in the work plan data. Thus, the manager can easily select the work team suitable for each work plan. The candidate team to be selected may be one work team or a plurality of work teams. The work team may be constituted by a plurality of splicing technicians, or may be constituted by one splicing technician.

In the management system 1, the work team DB 37 including splicing technician data used by the selection unit 36 to select the candidate team suitable for the work plan is provided in the management server 30. The management system 1 further includes the updating unit 38 that adds the fusion splicing data in the fusion splicing work performed according to the work plan to the work team DB 37, and updates the work team DB 37 after the fusion splicing work according to the work plan is completed. Accordingly, it is possible to select the work team more suitable for each work plan.

Although the management system and the management method thereof according to the present embodiment for managing the progress of the fusion splicing work by the fusion splicer have been described, the management system and the management method according to the present invention are not limited to the aforementioned embodiment, and various modifications can be applied. For example, although it has been described in the aforementioned embodiment that the fusion splicer 10 transmits the fusion splicing data to the management server 30 via the wireless information terminal 20, the fusion splicer 10 has the aforementioned functions of the wireless information terminal 20, and the fusion splicer 10 may directly transmit the fusion splicing data to the management server 30.

REFERENCE SIGNS LIST

1 . . . management system
10 . . . fusion splicer
11 . . . wireless communication unit
12 . . . information acquisition unit
13 . . . lock unit
20 . . . wireless information terminal
21 . . . communication unit 22 . . . work management unit
23 . . . unlock instruction unit
30 . . . management server
31 . . . communication unit
32 . . . work monitoring unit
33 . . . determination unit
34 . . . notification unit
35 . . . construction project DB
36 . . . selection unit
37 . . . work team DB
38 . . . updating unit
40 . . . management device
41 . . . communication unit
42 . . . registration unit
43 . . . status display unit
44 . . . selection instruction unit

The invention claimed is:

1. A fusion splicer management system for managing progress of a fusion splicing work performed by each splicing technician by using a fusion splicer, the system comprising:
    an acquisition unit configured to acquire fusion splicing data regarding the fusion splicing work performed by each splicing technician who uses each fusion splicer whenever each fusion splicing work is performed, the acquisition unit being provided in the fusion splicer;
    a determination unit configured to determine a progress status of each fusion splicing work by comparing the fusion splicing data with work plan data indicating a work plan, wherein the fusion splicing data is acquired from the acquisition unit via communication, at least a part of which includes a wireless communication; and
    a notification unit configured to notify of the progress status of each fusion splicing work determined by the determination unit.

2. The fusion splicer management system according to claim 1, wherein the determination unit determines whether or not each fusion splicing work is delayed from the work plan by comparing the fusion splicing data with the work plan data.

3. The fusion splicer management system according to claim 2, wherein the notification unit notifies a management device configured to manage the work plan, of the progress status of whether or not each fusion splicing work is delayed from the work plan in a predetermined cycle or for each determination of the delay.

4. The fusion splicer management system according to claim 1, wherein the fusion splicing data includes at least one piece of information of identification information of the used fusion splicer, identification information of the splicing technician who performs the fusion splicing work, a date and time of the fusion splicing, a location at which the fusion splicing is performed, a splicing loss of fusion-spliced optical fibers, an end surface angle of the fusion-spliced optical fibers, an eccentricity of the optical fiber, a splicing condition selected in the case of the fusion splicing, a determination result of a type of the optical fiber, observation images of an optical fiber before and after the splicing, the number of times of the splicing, a reinforcement condition, a time required for reinforcement, and the number of times of the reinforcement.

5. The fusion splicer management system according to claim 1,
    wherein individual wireless information terminals are assigned to the fusion splicers, respectively, and each fusion splicer is configured to be able to perform wireless connection with the corresponding wireless information terminal,
    wherein the work plan data is stored in a management server capable of communicating with the wireless information terminal via a communication line, and the acquisition unit is provided in the fusion splicer, and
    wherein the wireless information terminal transmits the fusion splicing data acquired by the acquisition unit to the management server, and the progress status of each fusion splicing work is determined by the determination unit provided in the management server.

6. The fusion splicer management system according to claim 1, further comprising:
    a selection unit configured to select a candidate team of the splicing technician suitable for each work plan,
    wherein the selection unit selects the candidate team suitable for the work plan based on at least one piece of information of a construction period in the work plan data, the scheduled number of times of the splicing of the optical fibers, and a splicing standard of the optical fiber.

7. The fusion splicer management system according to claim 6, further comprising:
    a team database including splicing technician data used by the selection unit to select the candidate team suitable for the work plan.

8. The fusion splicer management system according to claim 7, further comprising:
    an updating unit configured to add the fusion splicing data in the fusion splicing work performed according to the work plan to the team database, and update the team database after the fusion splicing work according to the work plan is completed.

9. A fusion splicer management method for managing progress of a fusion splicing work performed by each splicing technician by using a fusion splicer, the method comprising:
    acquiring, by the fusion splicer, fusion splicing data regarding the fusion splicing work performed by each splicing technician who uses each fusion splicer whenever each fusion splicing work is performed;
    acquiring, by a determination unit, the fusion splicing date from the fusion splicer via communication, at least a part of which includes a wireless communication;
    determining, by the determination unit, a progress status of each fusion splicing work by comparing the fusion splicing data with work plan data indicating a work plan; and
    notifying the progress status of each fusion splicing work determined in the determining.

* * * * *